(12) United States Patent
Nakada et al.

(10) Patent No.: US 6,553,829 B1
(45) Date of Patent: Apr. 29, 2003

(54) AIR FLOW SENSOR HAVING GROOVED SENSOR ELEMENT

(75) Inventors: Keiichi Nakada, Hitachinaka (JP); Izumi Watanabe, Hitachinaka (JP); Masamichi Yamada, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/609,065

(22) Filed: Jun. 30, 2000

(30) Foreign Application Priority Data

Jun. 30, 1999 (JP) ............................. 11-184770

(51) Int. Cl.$^7$ ................................. G01F 1/68
(52) U.S. Cl. .................................. 73/204.26
(58) Field of Search ................ 73/204.26, 204.24, 73/204.22, 204.25

(56) References Cited

U.S. PATENT DOCUMENTS

| | | | |
|---|---|---|---|
| 4,680,963 A | * | 7/1987 | Tabata et al. .............. 73/204 |
| 5,404,753 A | * | 4/1995 | Hecht et al. .............. 73/204.22 |
| 5,723,784 A | | 3/1998 | Lembke et al. |
| 6,235,643 B1 | * | 5/2001 | Mui et al. ................... 438/719 |
| 6,176,131 B1 | * | 6/2001 | Hecht et al. .............. 73/204.26 |

FOREIGN PATENT DOCUMENTS

JP          9-26343          1/1997

* cited by examiner

Primary Examiner—Hezron Williams
Assistant Examiner—Corey D. Mack
(74) Attorney, Agent, or Firm—Crowell & Moring LLP (57) ABSTRACT

Grooves into which an adhesive agent is poured are formed on the adhesion face of a sensor element, the adhesion face being adhered to a surface of a sensor-supporting member, which in turn can make the depth of a layer of the adhesive agent between the sensor element and the sensor-supporting member zero, and remove the difference in level between both the top surfaces of the sensor element and the sensor-supporting member.

16 Claims, 11 Drawing Sheets

FIG. 19 PRIOR ART

AIR FLOW SENSOR HAVING GROOVED SENSOR ELEMENT

BACKGROUND OF THE INVENTION

The present invention relates to an air flow sensor using a heated resistor (hereafter referred to as a heated resistor type air flow sensor), which measures the flow rate of air with a heated resistor, and especially to a heated resistor type air flow sensor suitable for measuring the flow rate of air taken into an internal combustion engine.

Figure 19:
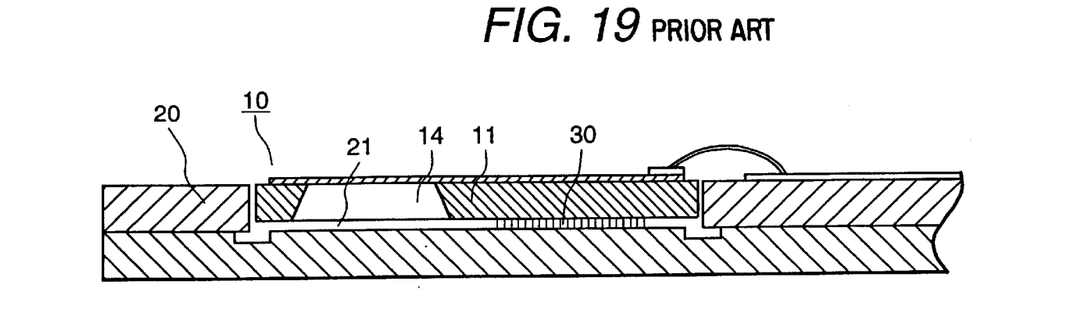
FIG. 19 is a vertical cross-section of a known air flow sensor on which a thin-film sensor region is formed on a semiconductor as described above.

A heated resistor type air flow sensor has mainly been used for an air flow sensor, which is located in the path of intake air in an internal combustion engine such as a car, to measure the amount of the intake air, because this type air flow sensor can measure the mass flow rate of the intake air. Further, a heated resistor type air flow sensor in which a thin-film sensor region is formed on a semiconductor (for example, silicone) substrate by using a fine processing technique for semiconductors, has attracted special interest recently, because such an air flow sensor using a semiconductor can easily be fabricated by a mass-production method, which in turn reduces the fabrication cost of the air flow sensors, and it can also be driven with low power. An air flow sensor such as that disclosed in Japanese Patent Application Laid-Open Hei 9-26343, is well-known as a heated resistor type air flow sensor in which a thin-film sensor region is formed on a semiconductor (for example, silicone) substrate, and only one side of a sensor element 10 is attached to a cut-out space in a sensor-supporting part (a floating type support structure: a cantilever support structure) as shown in FIG. 19.

If the whole adhesion face of a sensor element is adhered to a sensor-supporting member, it is highly likely that the thin-film sensor region will be damaged in the adhesion process, and the adhesion part between the sensor element and the supporting part may also be damaged by a thermal cycle in some operation conditions, due to the difference between the linear expansion coefficients of the sensor element and the supporting member. Therefore, the above-mentioned floating type support structure is usually adopted.

However, in this floating type support structure, there is a problem that it is difficult to keep both the top surfaces of the sensor element and the sensor-supporting member in the same plane in the adhesion process. If a difference in level between the top surfaces of the sensor element and the sensor-supporting member is generated due to a mal-control for the thickness of the adhesive agent, and so on in the heated resistor type air flow sensor including a minute sensor element formed with a semiconductor processing technique, the flow pattern of air on the top surface of the sensor element will change, which in turn will cause a variation in characteristics of the heated resister type air flow sensor. Moreover, there is always a gap between the sensor element and the supporting member, and air flows onto the back surface of the sensor element through the gap. Thus, since a cavity space under the sensor region communicates with the gap in the floating type supporting structure, there is a problem that it is difficult to completely prevent the undesirable air flow into the cavity space. Further, since the spread-out of the adhesive agent onto the top surfaces of the sensor element and the supporting member cannot be controlled in the adhesion processing, the sensor element is highly likely to be damaged by the leakage of the adhesive agent into the cavity space. Furthermore, in the case when the adhesive agent is dropped onto the supporting member in order to adhere the sensor element to the supporting member, if air is mixed with the dropped adhesive agent in the adhesion processing, and the mixed air remains in the adhesive agent, this will cause a harmful effect upon the later-performed bonding process of the sensor element and an external signal processing circuit.

SUMMARY OF THE INVENTION

The present invention has been achieved with consideration to the above-described problems, and is aimed at solving those problems.

The above objective of the present invention is to achieve the provision of an air flow sensor comprising: a sensor element with a heated resistor formed on a semiconductor substrate via an electrical insulation layer; a sensor-supporting member containing a cut-out space in which the sensor element is fixed; a first region in which the sensor element contacts the sensor-supporting member in the cut-out space; and a second region in which the sensor element is adhered to the sensor-supporting member with adhesive agent put into grooves formed on the back face of the sensor element in the second region.

The grooves into which the adhesive agent is poured are shaped, for example, by an anisotropic etching method, and the generation of a difference in level between the top surfaces of the sensor element and the sensor-supporting member can be prevented by adhering the sensor element and the sensor-supporting member with the adhesive agent poured into the grooves. Further, by making the thickness of the adhesive agent between the sensor element and the sensor-supporting member zero, the communication of the gap between the sensor element and the sensor-supporting member and the cavity space is severed, which in turn can prevent the generation of an undesirable air flow into the cavity space. Furthermore, by letting an excess amount of the adhesive agent flow in a predetermined direction, its spread-out onto the top surface of the sensor element can be prevented.

In addition, by forming notches or grooves on the adhesion face of the sensor-supporting member, the above improvement can be achieved, and the remaining of air bubbles in the adhesion agent can also be prevented.

DETAILED DESCRIPTION OF THE EMBODIMENTS

Hereafter, details of the embodiments according to the present invention will be explained with reference to the drawings.

Figure 1:
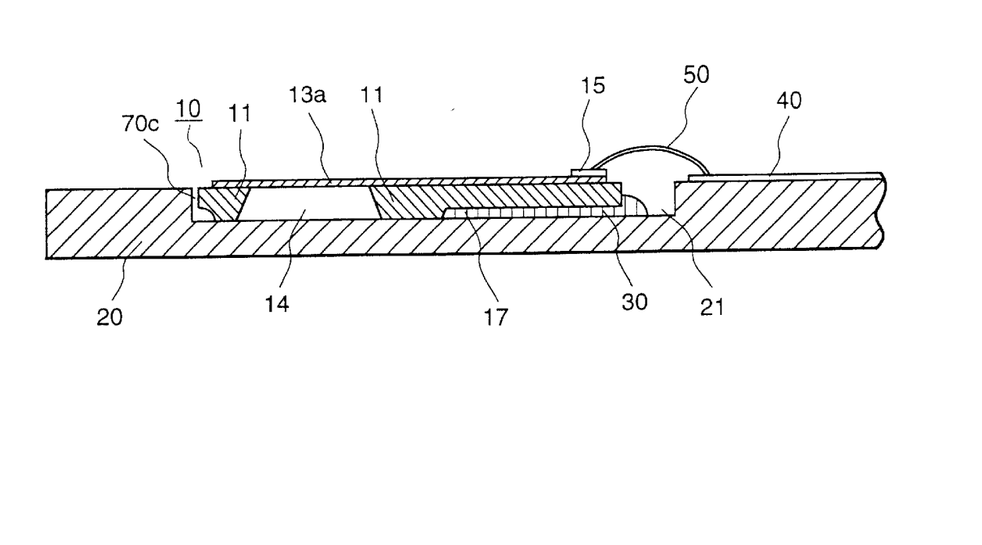
FIG. 1 is a vertical cross section of an air flow sensor including a sensor element and a sensor-supporting member, in the longitudinal direction of the air flow sensor, of a first embodiment according to the present invention.
Figure 2:
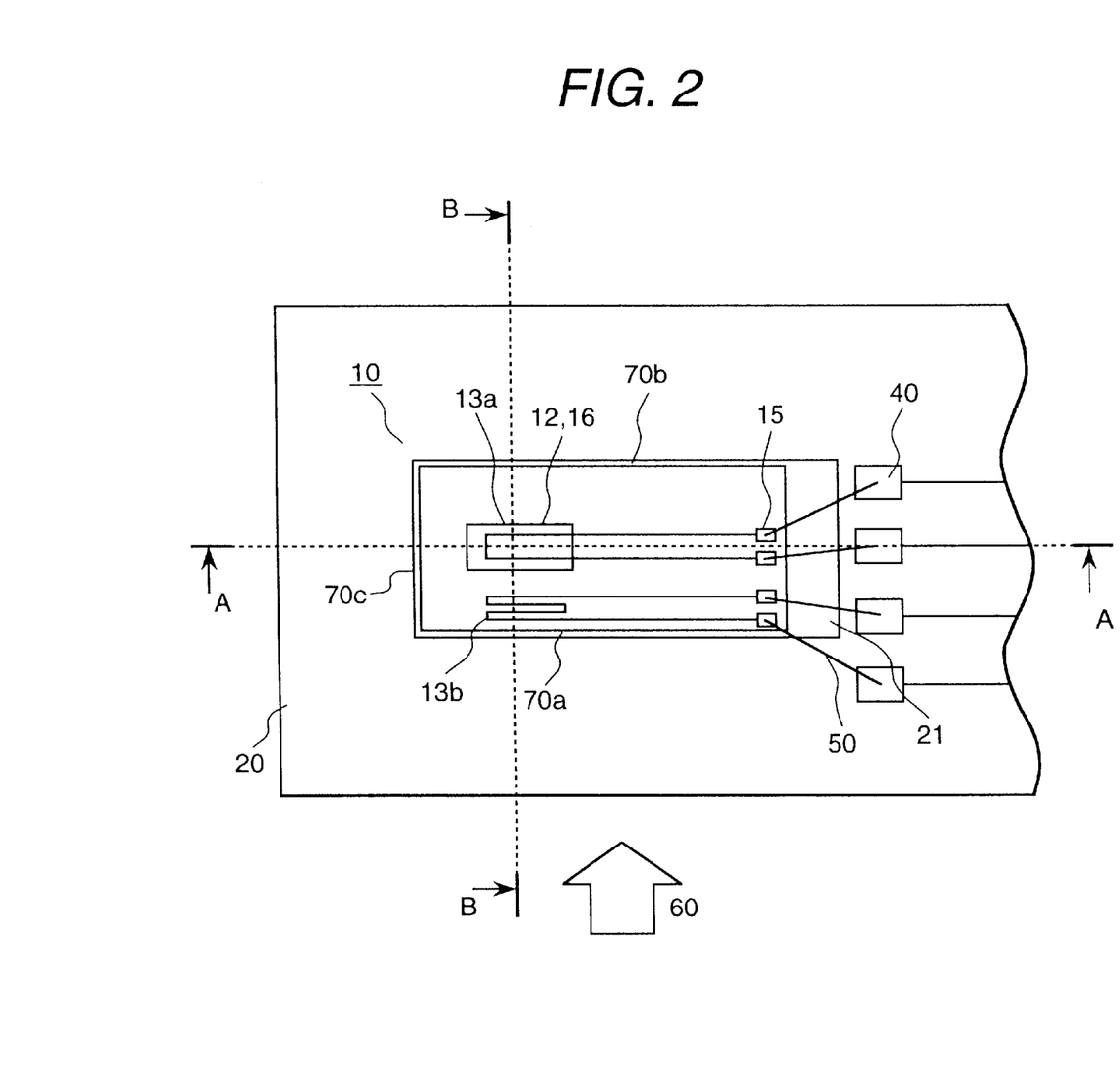
FIG. 2 is a plan view of an air flow sensor including a sensor element and a sensor-supporting member, shown in FIG. 1 and FIG. 6.

FIG. 1 is a vertical cross section in the longitudinal direction of an air flow sensor including a sensor element and a sensor-supporting member 20 to which the sensor element 10 is attached with an adhesive agent 30, of a first embodiment according to the present invention. Also, FIG. 1 is a cross-section at the line A—A in FIG. 2 showing the plan view of the air flow sensor.

The sensor 10 is fabricated by using a semiconductor processing technique, which includes at least one heated resistor 13a and an ambient temperature-measuring resistor 13b located on an electrical insulation layer 12 formed on a single-crystal silicone substrate 11. Further, a cavity space (a cave) is formed under the heated resistor 13a by etching the single-crystal silicone substrate 11. In accordance with the above structure, it is possible to prevent the heat generated in the heated resistor 13a from leaking via the single-crystal silicone substrate 11.

The heated resistor 13a and the ambient temperature-measuring resistor 13b in the sensor element 10 are connected to a sensor element electrode 15, and the sensor element electrode 15 is further connected to an electrode 40 of a signal processing circuit formed on an electrical insulation substrate made of alumina, etc., by a bonding process. The signal processing circuit feeds current and voltage to the sensor element by using a well-known control method, and evaluates the value of an electrical signal sent from the sensor element 10. The sensor-supporting member 20 on which the sensor element 10 is attached is located in a secondary air flow path in an air intake path of an internal combustion engine.

Figure 3:
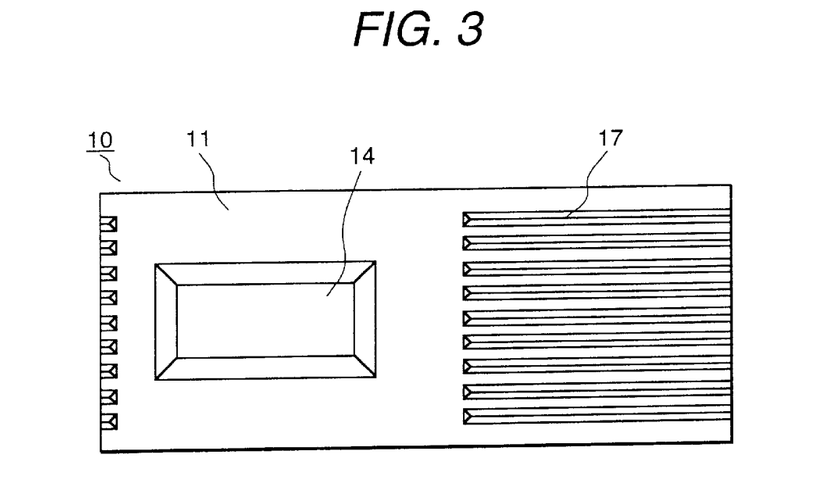
FIG. 3 is a plan view of the air flow sensor shown in FIG. 1, which is viewed from the side of the adhesion face of the sensor element.
Figure 4:
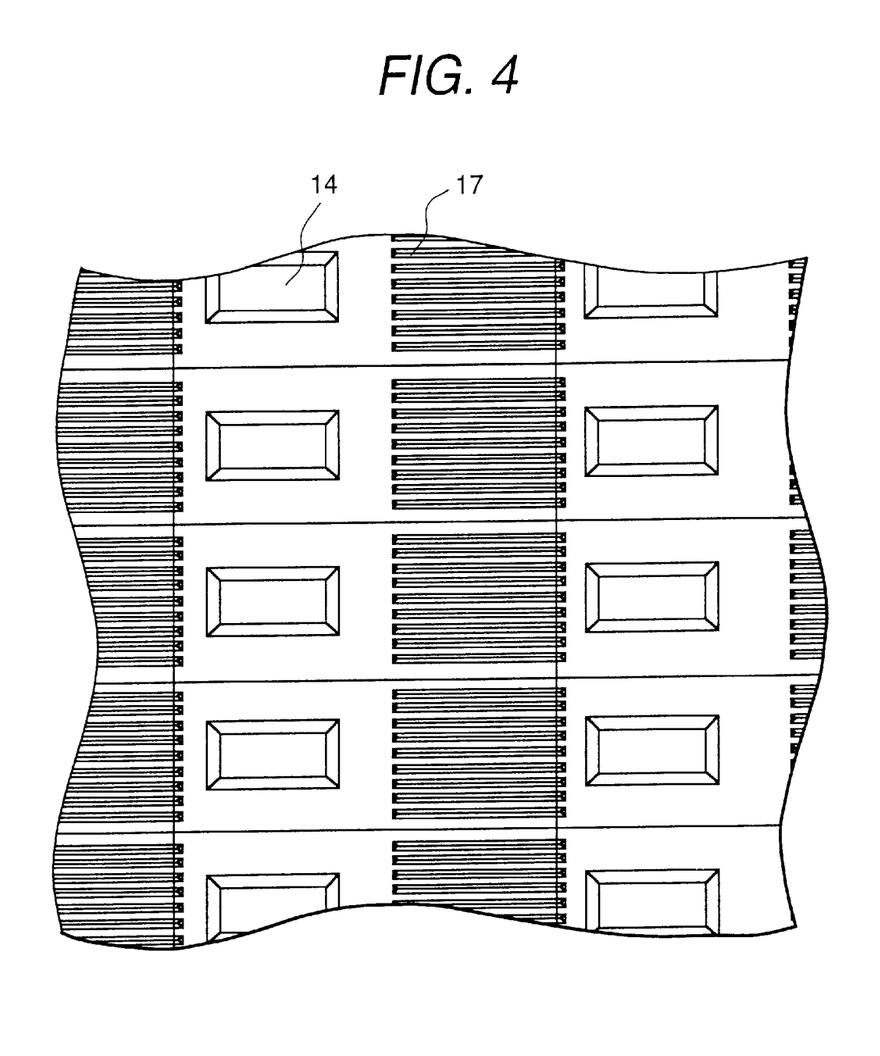
FIG. 4 is a partial plan view of a plurality of air flow sensors formed on the same substrate which is not yet divided into respective chips such as that shown in FIG. 3, being viewed from the side of the adhesion faces of the sensor elements.
Figure 5:
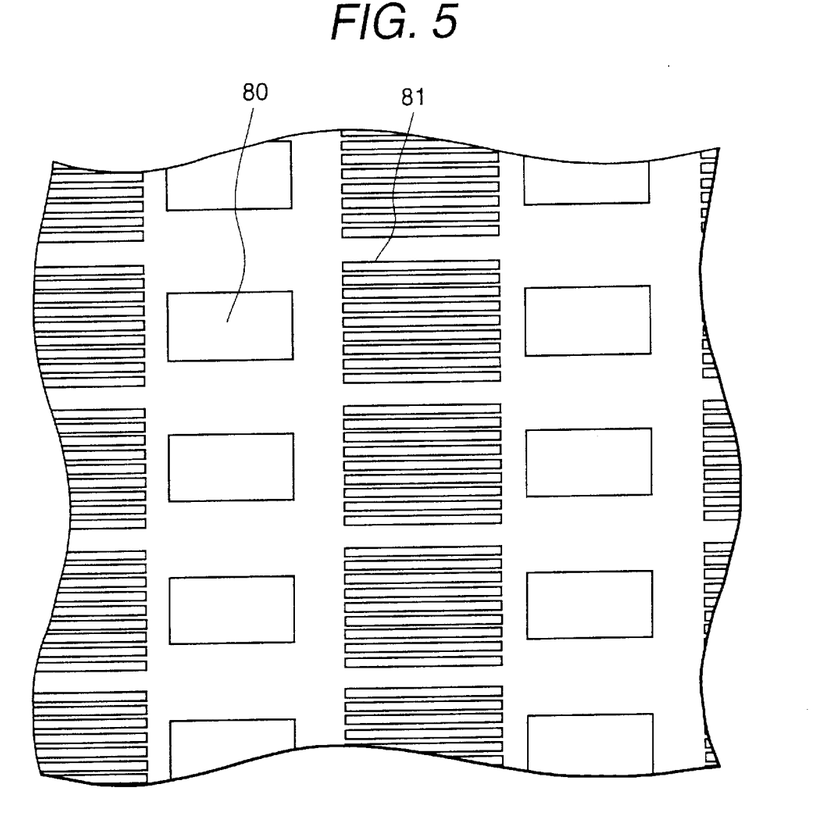
FIG. 5 is a partial plan view of a plurality of masks used for patterning the etching regions of the respective sensor elements shown in FIG. 4.

FIG. 3 shows a plan view of the air flow sensor shown in FIG. 1, which is viewed from the side of the adhesion face of the sensor element, and FIG. 4 is a partial plan view of a plurality of air flow sensors formed on the same substrate which is not yet divided into chips of respective chips such that shown in FIG. 3, being viewed from the side of the adhesion faces of the sensor elements. Further, FIG. 5 is a partial plan view of a plurality of masks used for patterning the etching regions of the respective sensor elements shown in FIG. 4.

Figure 18:
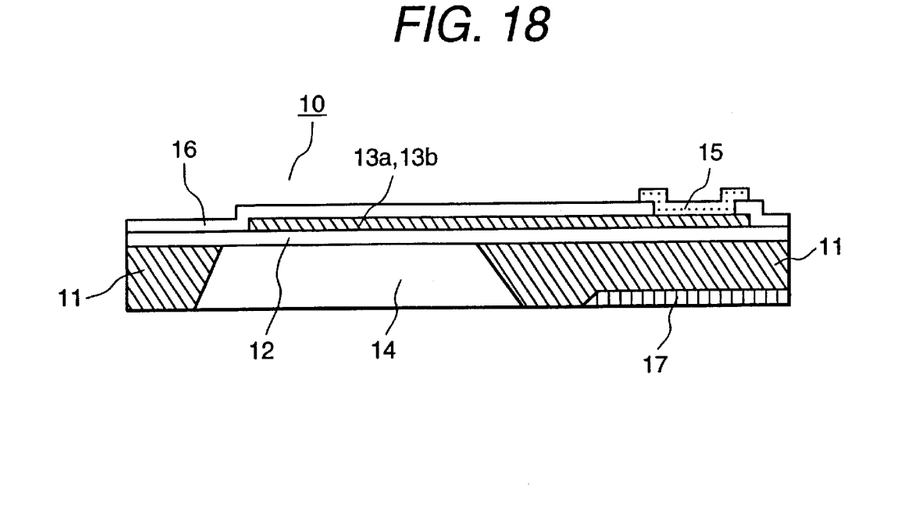
FIG. 18 is a vertical cross section of a conventional air flow sensor including a sensor element and a sensor-supporting member, in the longitudinal direction of the conventional air flow sensor.

In the following, the fabrication processing of the respective sensor elements 10 will be explained with reference to FIG. 18. After a silicon dioxide layer used for respective electrical insulation layers 12 is formed on the single crystal silicone substrate 11 by using a thermal oxidization method, a CVD (Chemical Vapor Deposition) method, etc., a silicon nitride layer is further formed. Next, a polycrystal silicone layer in which the respective heated resistors 13a and the respective ambient temperature-measuring resistors 13b are shaped is formed by the CVD method, and the doping of phosphorous as impurities is further performed by a thermal diffusion method or an ion-injection method. After that, by shaping the resist into a predetermined pattern with a well-known photolithography technique and patterning the polycrystal silicon layer, for example, with a reactive ion-etching method, the respective heated resistors 13a and the respective ambient temperature-measuring resistors 13b are formed. Further, after each silicon nitride layer is formed with the CVD method, etc., as a protection layer, a silicon oxide layer is formed with the CVD method, etc. Furthermore, the protection layer of the area at which each electrode 15 is formed is removed with an etching process, and each electrode 15 is formed with aluminum at the above region. Lastly, to form the respective cavity spaces 14 and respective sets of grooves 17 into which the adhesive agent is poured, a silicon nitride layer is formed on the face of the single crystal substrate 11, opposite to one on which the heated resistor 13a is formed. Further, a resist shown in FIG. 5 is shaped into a predetermined pattern with the well-known photolithography technique, and the patterning of the resist is carried out. After that, the respective cavity space 14 and the respective sets of grooves 17 into which the adhesive agent is poured are formed, and the wafer in which the plurality of the sensor elements 10 are formed is divided into the respective sensor-element chips by means of dicing. The longer and shorter edges of each divided sensor element chip 10 are about 6 mm and 2,5 mm, respectively, and its thickness is about 0.3 mm. Furthermore, in the shaping of the grooves 17, it is used that the face (111) is not etched in the anisotropic etching, and the aperture regions 81 for the respective sets of grooves 17 are patterned such that the depth of the grooves 17 in the examples shown in the figures is about 0.1 mm.

The sensor-supporting member 20 is made of alumina, metal, etc. Each cut-out space 21 is shaped such that each sensor element 10 is completely contained in the cut-out space 21. Moreover, the depth of the cut-out space 21 is the same as that of the sensor element 10, and is about 0.3 mm.

Although the sensor element 10 is adhered to the sensor-supporting member 20 with the adhesive agent 30, since the adhesive agent 30 flows into the grooves 17, in accordance with the present invention, the sensor element 10 is adhered to the sensor-supporting member 20 such that an adhesive-agent layer is not generated between the sensor element 10 and the sensor-supporting member 20, that is: the thickness of such an adhesive agent layer is 0. Accordingly, both the top surfaces of the sensor element 10 and the sensor-supporting member 20 are in the same plane.

Since the depth of the above adhesive agent layer is zero, that is: the gap regions between the sensor element and the sensor-supporting member 20; 70a, 70b, and 70c are completely separated from the cavity space 14 under the thin film sensor region, the air which has flowed into the gap regions 70a, 70b, and 70c hardly enters the cavity space 14.

Moreover, any excess of adhesive agent 30 flows out due to the grooves 17 in the direction of the signal processing circuit region 40, to which the electrode 15 of the sensor element 10 is connected by the bonding. Since the regions to which the bonding is applied, and the signal processing circuit region, do not contact the intake air flow, the performance of the sensor element 10 is not affected in the slightest by any excess adhesive agent in those regions.

Figure 6:
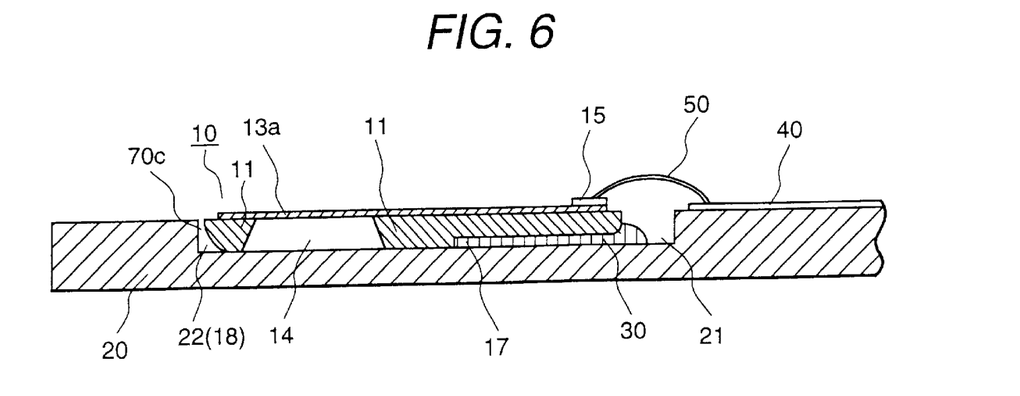
FIG. 6 is a vertical cross section of an air flow sensor including a sensor element and a sensor-supporting member, in the longitudinal direction of the air flow sensor, of a second embodiment according to the present invention.
Figure 7:
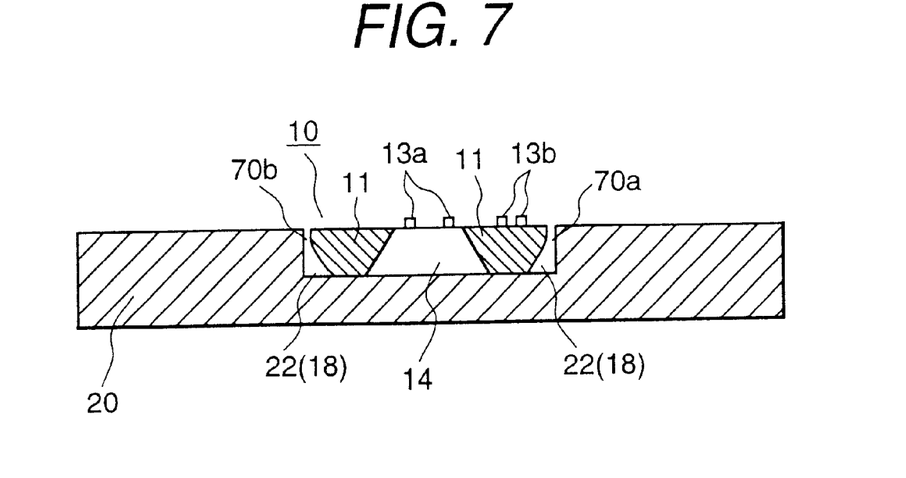
FIG. 7 is a vertical cross section of the air flow sensor of the second embodiment according to the present invention, in the direction perpendicular to the longitudinal direction of the air flow sensor.

FIG. 6 and FIG. 7 show vertical cross sections of an air flow sensor including a sensor element and a sensor-supporting member, in the longitudinal direction of the air flow sensor, viewed from the line A—A in FIG. 2, and in the direction perpendicular to the longitudinal direction, viewed from the line B—B in FIG. 2, respectively, of a second embodiment according to the present invention.

Figure 8:
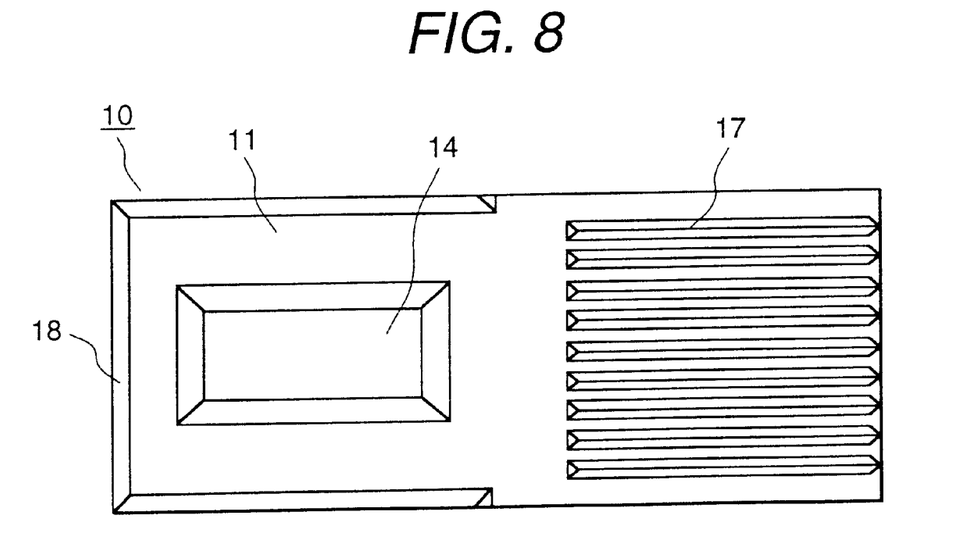
FIG. 8 is a plan view of the air flow sensor shown in FIG. 1, which is viewed from the side of the adhesion face of the sensor element.
Figure 9:
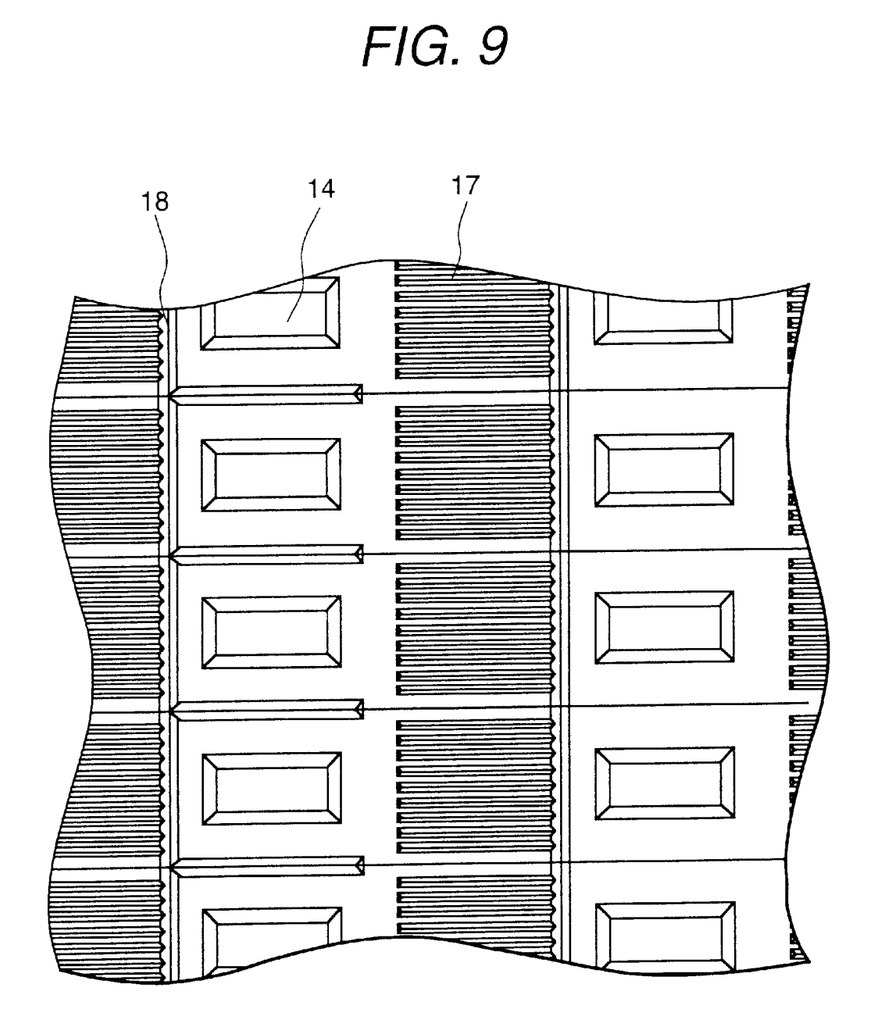
FIG. 9 is a partial plan view of a plurality of air flow sensors formed on the same substrate which is not yet divided into chips of respective chips such as that shown in FIG. 8, being viewed from the side of the adhesion faces of the sensor elements.
Figure 10:
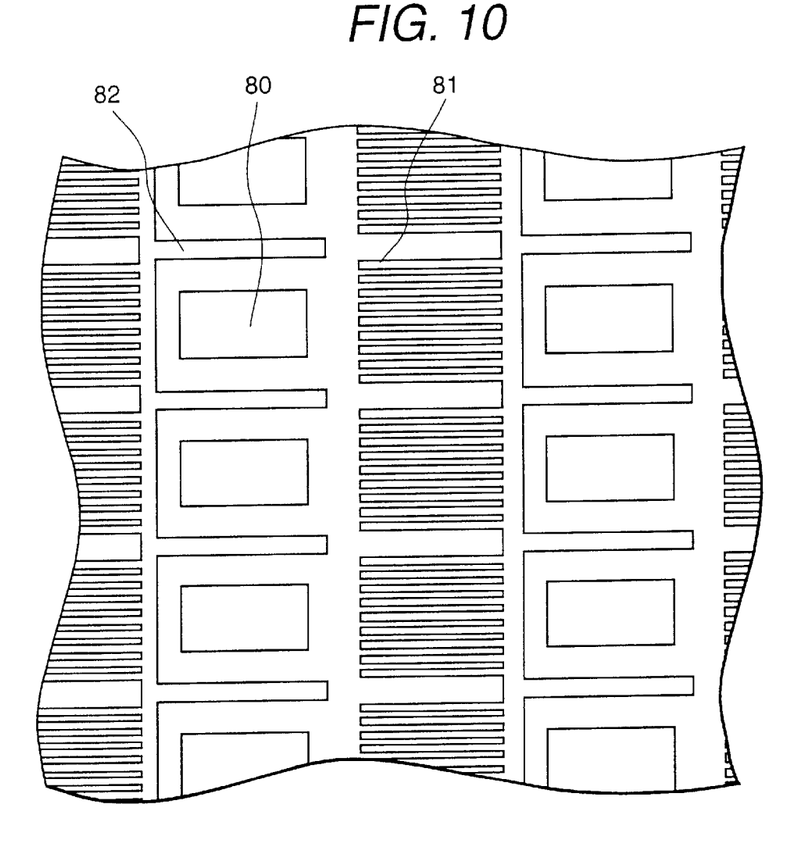
FIG. 10 is a partial plan view of a plurality of masks used for patterning the etching regions of the respective sensor elements shown in FIG. 9.

Further, FIG. 8 is a plan view of the air flow sensor element 10 shown in FIG. 1, which is viewed from the side of the adhesion face of the sensor element 10 shown in FIG. 6, and FIG. 9 is a partial plan view of a plurality of air flow sensor elements 10, formed on the same substrate which is not yet divided into chips of respective chips, such as that shown in FIG. 8, being viewed from the side of the adhesion faces of the sensor elements. Furthermore, FIG. 10 is a partial plan view of a plurality of masks used for patterning the etching regions of the respective sensor elements 10 shown in FIG. 9.

The sensor element 10 of the second embodiment is obtained by further forming the etched edges (the etched edge regions 18) around the cavity space 14, in the single crystal substrate 11 of the sensor element 10 of the first embodiment.

The fabrication processing of the respective sensor elements 10 of the second embodiment is the same as that of the sensor element 10 of the first embodiment. However, in the process for forming the respective cavity spaces 14 in the sensor elements 10, and the respective sets of grooves 17 in the second embodiment, the mask shown in FIG. 10 is used in place of the mask shown in FIG. 5, which is used for fabricating the respective sensor elements 10 of the first embodiment. In the etched edge regions 18, the respective aperture regions 82 are patterned such that the depth of the grooves 17 is about 0.2 mm in the examples shown in FIGS. 6 and 7.

The process of adhering the sensor element 10 to the sensor-supporting member 20 is the same as that for the sensor element 10 of the first element.

In the second element, an air flow channel 22 is created by the etched edge regions 18 and the cut-out space 21 in the sensor-supporting member 20. Therefore, in the air flow 60 from the upstream to the downstream of the sensor element 10 such as that shown in FIG. 2, the air flow entering the gap 70a upstream of the sensor element 10 flows along the channel 22, and flows out from the gap 70b downstream of the sensor element 10. Thus, the second embodiment can more reliably prevent the air, which enters the gaps 70a, 70b, and 70c, from flowing into the cavity space 14, in comparison with the first embodiment.

The second embodiment has also the effects of keeping both the top surfaces of the sensor element 10, and the sensor-supporting member 20 in the same plane, and of flowing any excess adhesive agent out from the grooves 17, toward the side part of the cut-out space 21 at the side the signal processing circuit region 40, where the bonding of the electrodes is performed.

Figure 11:
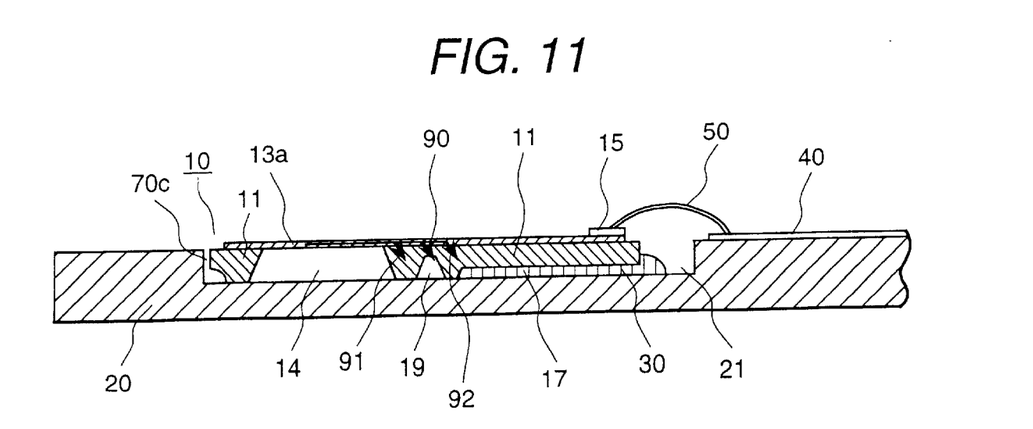
FIG. 11 is avertical cross section of an air flow sensor including a sensor element and a sensor-supporting member, in the longitudinal direction of the air flow sensor, of a third embodiment according to the present invention.
Figure 12:
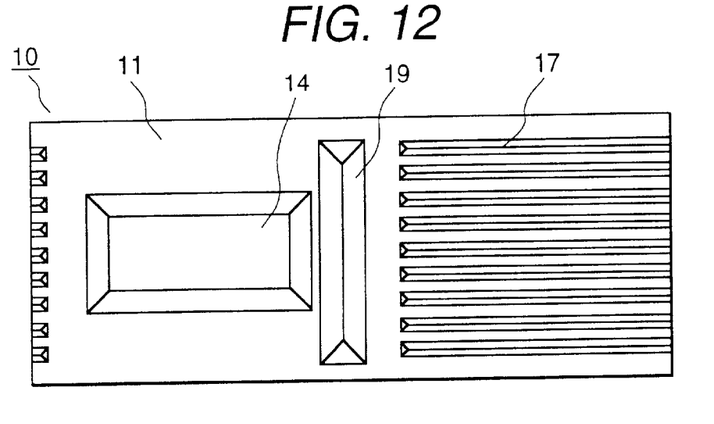
FIG. 12 is a plan view of the air flow sensor shown in FIG. 11, which is viewed from the side of the adhesion face of the sensor element.

FIG. 11 shows a vertical cross section of an air flow sensor including a sensor element 10 and a sensor-supporting member 20, in the direction perpendicular to the longitudinal direction of the air flow sensor, of a third embodiment according to the present invention, and FIG. 12 shows a plan view of the air flow sensor shown in FIG. 11, which is viewed from the side of the adhesion face of the sensor element 10.

In the third embodiment, a groove 19 is further shaped between the cavity space 14 and the grooves 17.

Figure 13:
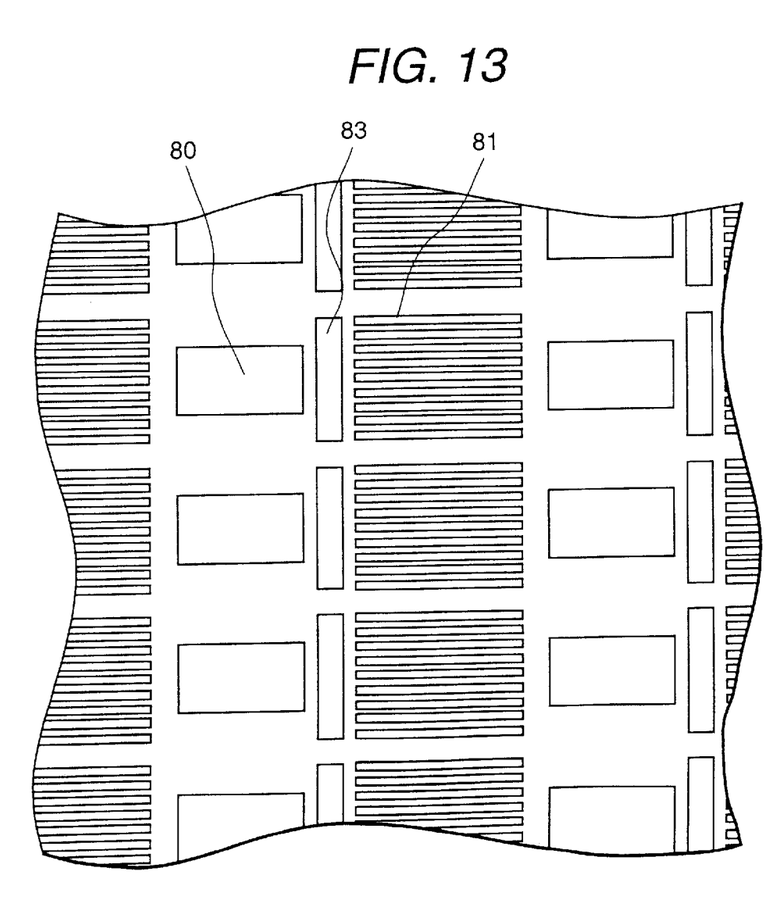
FIG. 13 is a partial plan view of a plurality of masks used for patterning the etching regions of the respective sensor elements shown in FIG. 9.

The fabrication processing of the sensor element 10 of the third embodiment is the same as that of the sensor element 10 of the first embodiment. However, in the process of forming the cavity space 14 in the sensor element 10, the grooves 17, and the groove 19 additionally created in the third embodiment, the mask shown in FIG. 13 is used in place of that shown in FIG. 5, which is used for fabricating the sensor element 10 of the first embodiment. Each aperture region 83 is patterned such that the depth of the groove 19 is equal to the thickness of the single crystal silicone substrate 11.

In the third embodiment, since any excess adhesive agent 30 proceeding toward the cavity space 14 flows into the groove 19, and is stored there, the adhesive agent 30 is prevented from enters the cavity space 14.

Also, in FIG. 11, the directions of the heat transfer from the heated resistor 13a are indicated by the flow lines 90, 91, and 92. The flow line 90 indicates the heat transfer to the air in the groove 19, and the flow lines 91 and 92 indicate the heat conduction to the single crystal silicone substrate 11. Accordingly, the amount of the heat transfer indicated by the flow line 90 is considerably smaller than the amount of the heat conduction indicated by the flow lines 91 and 92. Therefore, the amount of the heat transfer to the single crystal silicone substrate 11 with the groove 19, can be less reduced than that without the groove 19. Thus, an unavailing heat-generation in the heated resistor 13b can be suppressed, and this can improve the performance of the heated resistor type air flow sensor.

Figure 14:
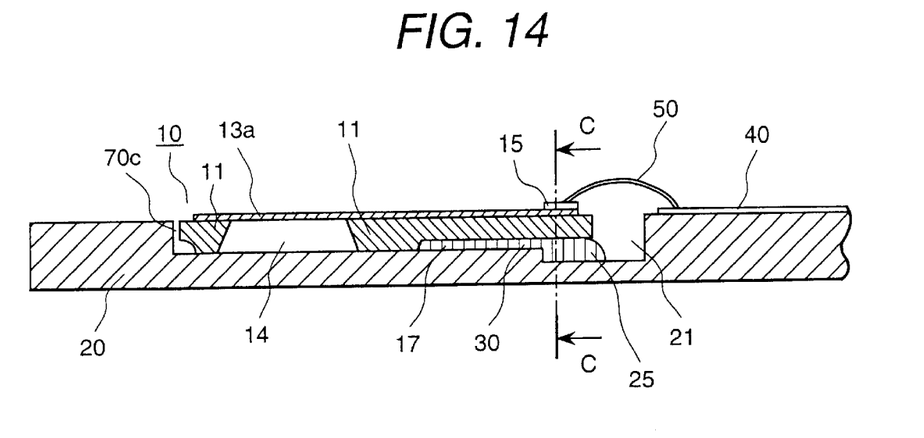
FIG. 14 is avertical cross section of an air flow sensor including a sensor element and a sensor-supporting member, in the longitudinal direction of the air flow sensor, of a fourth embodiment according to the present invention.
Figure 15:
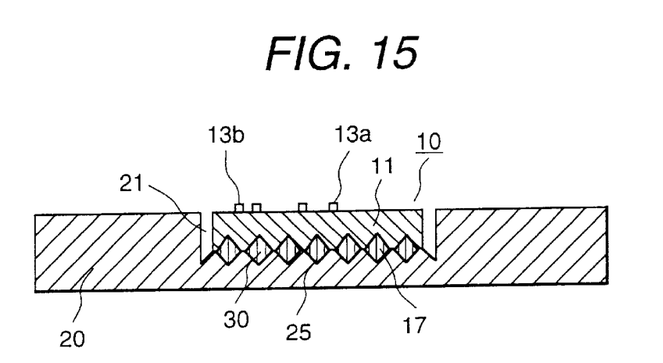
FIG. 15 is a vertical cross section of the air flow sensor of the fourth embodiment according to the present invention, in the direction perpendicular to the longitudinal direction of the air flow sensor.

FIG. 14 shows a vertical cross section in the longitudinal direction of an air flow sensor including a sensor element 10 and a sensor-supporting member 20, of a fourth embodiment according to the present invention, and FIG. 15 shows a vertical cross section of the air flow sensor, viewed from the line C—C shown in FIG. 14. In the fourth embodiment, the sensor element 10 is the same as that of the first embodiment, and grooves 25 are shaped in a rectangular area, which is adjacent to the grooves 17, on the adhesion region of the sensor-supporting member.

According to the fourth embodiment, any excess adhesive agent 30, generated in the adhering of the sensor element 10 to the sensor-supporting member 20, flows out due to the grooves 17 to the side part of the cut-out space 21 at the side of the signal processing circuit region 40, where the bonding of the electrodes is performed, and it further flows into the grooves 25 formed in the rectangular area. Thus, the spread of an excess adhesive agent 30 onto the top surface of the sensor element 10 can be more reliably prevented in comparison with the first to third embodiments.

Further, since the mixing of air in dropping of the adhesive agent 30 into the cut-out space 21 is prevented, it can also be prevented that air remains in the adhesive agent 30.

Furthermore, by creating a cut-out space 23 in the sensor-supporting substrate 20 in place of the grooves 25 shaped in the rectangular area, the same effect as that obtained by the grooves 25 can be obtained.

Figure 17:
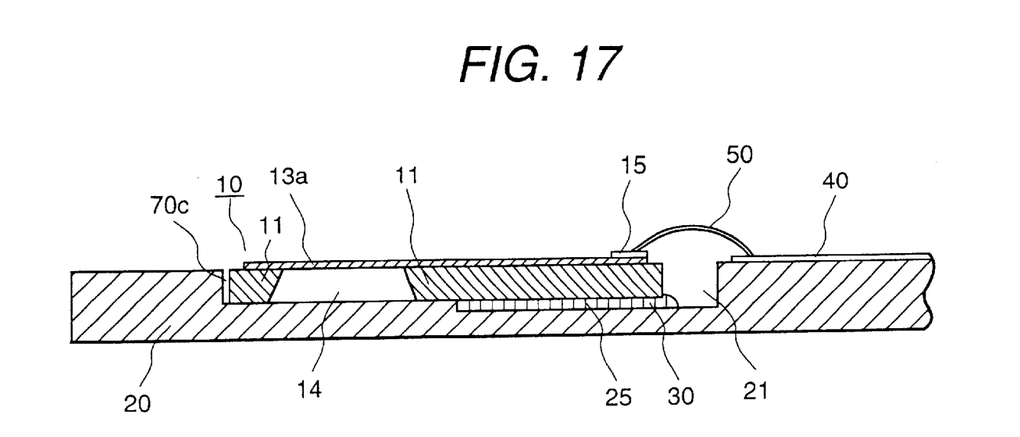
FIG. 17 is a vertical cross section of an air flow sensor including a sensor element and a sensor-supporting member, in the longitudinal direction of the air flow sensor, of a sixth embodiment according to the present invention.

Although there are the grooves 17, into which the adhesive agent is poured, in the example shown in FIG. 14, the structure with a cut-out space, such as that shown in FIG. 17, in which grooves are not shaped, gives the same effect as that obtained by the grooves 25.

Figure 16:
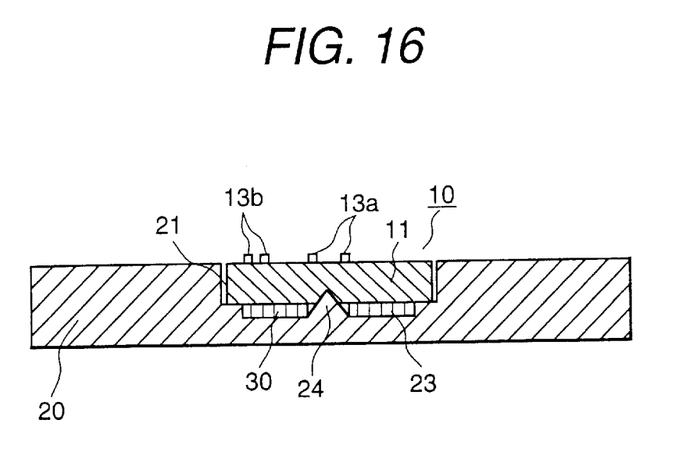
FIG. 16 is a vertical cross section of an air flow sensor including a sensor element and a sensor-supporting member, in the longitudinal direction of the air flow sensor, of a fifth embodiment according to the present invention.

FIG. 16 shows a vertical cross section in the longitudinal direction of an air flow sensor including a sensor element and a sensor-supporting member, of a fifth embodiment according to the present invention, and a projecting portion 24 is created in the cut-out space 23, into which the adhesive agent 30 is poured, formed in the sensor-supporting member 20. In this fifth embodiment, by using one of the grooves 17 and the projecting portion 24, the positioning of the sensor element 10 in the sensor-supporting member 20 can be easily carried out. Since the area of the thin-film sensor region in the sensor element is very small, if the relative position between the sensor element 10 and the sensor-supporting member 20 deviates only very slightly, this affects the performance of the air flow sensor, which in turn causes the variation in the performance of air flow sensors in mass production. Therefore, reliable positioning of the sensor element 10 in the sensor-supporting member 20 makes for great efficiency.

In addition, concerning the adhesive agent 30 used for the adhesion structures described in the above embodiments, if an adhesive agent which does not include metal such as silver (Ag) is used, this can improve the performance of the air flow sensor.

Generally, an adhesive agent with an excellent thermal conductivity, for example, one including metal such as silver (Ag) is used so as to allow the heat in a semiconductor chip to flow to a substrate, when the semiconductor chip is adhered to a substrate made of alumina, etc. However, in the air flow sensor, it is not necessary to let the heat flow from the sensor element 10 to the sensor-supporting member 20. Conversely, the using of the adhesive agent including metal such as silver (Ag) makes the heat easily conduct from the sensor element 10 to the sensor-supporting member 20 if the temperature of the sensor-supporting member 20 becomes. higher than that of the sensor element under some operational conditions, which in turn gives a harmful effect on the performance of the air flow sensor.

However, since the hardness of an adhesive agent not including metal is lower than that of an adhesive agent including metal, the ultra-sonic vibration is absorbed by the non-metal adhesive agent in the bonding process in which gold wires 50 are used for connecting the sensor element 10 and the external signal processing circuit, and this degrades the easiness in the bonding processing for a floating type supporting structure. On the other hand, since the low hardness of the adhesive agent does not affect the easiness in the bonding processing for a united structure of the sensor element 10 and the sensor-supporting member 20 such as that devised in the present invention, it has become possible to use a non-metal adhesive agent, which in turn can improve the performance of the air flow sensor.

In accordance with the present invention, by reducing the effect caused by the presence of an adhesive agent layer, it is possible to make the difference in level between the top surface of the sensor element 10 and that of the sensor-supporting member 20 negligibly small, and this can decrease the variation in the performance of the air flow sensors in mass production.

Further, since the gap between the sensor element 10 and the sensor-supporting member 20 can be separated from the cavity space 14 under the thin-film sensor region, an undesirable flow of air into the cavity space 14 can be prevented.

Furthermore, since it is possible to expel the excess adhesive agent in the direction to an area in which an adhesive agent does not cause a harmful effect, the spread of the excess adhesive agent onto the top surface of the sensor element can be prevented.

What is claimed is:

1. An air flow sensor comprising:
   a sensor element with a heated resistor formed on a semiconductor substrate by way of an electrical insulation layer;
   a sensor-supporting member containing a cut-out space in which said sensor element is fixed;
   a first region in which said sensor element contacts said sensor-supporting member in said cut-out space; and
   a second region in which said sensor element is adhered to said sensor-Supporting member with an adhesive agent poured into a groove or grooves formed in said second region.

2. An air flow sensor according to claim 1, wherein a cavity space is formed on the back face opposite to the top face of said semiconductor substrate, on which said heated resistor is formed, and said cavity space is air-tightly sealed by said first region and/or said second region.

3. An air flow sensor according to claim 1, wherein a cavity space is formed on the back face opposite to the top face of said semiconductor substrate, on which said heated resistor is formed, and said cavity space is surrounded by said first region.

4. An air flow sensor according to claim 1, wherein said groove or grooves are formed on one of respective surfaces in said sensor element and said sensor-supporting member.

5. An air flow sensor according to claim 4, wherein an excess amount of said poured adhesive agent is expelled to an outside region through said groove or grooves.

6. An air flow sensor according to claim 5, wherein said outside region is a sunken space formed on one of respective surfaces in said sensor element and said sensor-supporting member.

7. An air flow sensor according to claim 4, wherein a cross section of each groove is shaped into an inverted triangular shape.

8. An air flow sensor according to claim 4, wherein said grooves are provided with two groups which are formed on said respective surfaces in said sensor element and said sensor-supporting member, and said poured adhesive agent can communicate with both said groups of said grooves.

9. An air flow sensor comprising:
a sensor element with a heated resistor formed on a semiconductor substrate by way of an electrical insulation layer; and
a sensor-supporting member to which said sensor element is adhered with an adhesive agent;
wherein at least one groove is formed on an adhesion surface of said sensor element, said adhesion surface being adhered to a surface of said sensor-supporting member.

10. An air flow sensor according to claim 9, wherein angle-line parts of respective edges in said semiconductor substrate are scraped off by etching.

11. An air flow sensor according to claim 9, wherein said groove is formed by etching in the longitudinal direction of said semiconductor substrate, and at least one end side of said groove reaches one of two end sides of said substrate.

12. An air flow sensor according to claim 9, wherein said groove is a first groove formed by etching in the longitudinal direction of said semiconductor substrate, and a second groove is formed between said heated resistor and said first groove by etching in the direction perpendicular to said longitudinal direction, such that the upper apex angle line of said second groove reaches said electrical insulation layer.

13. An air flow sensor according to claim 9, wherein said first groove is formed by etching in the longitudinal direction of said semiconductor substrate; a cut-out area is in a region in which said sensor element is adhered to said sensor-supporting member; and angular projection whose cross section has a triangular shape provided in said cut-out area in parallel with said first groove; and the height of said projection is larger than the depth of said cut-out area.

14. An air flow sensor according to claim 1, wherein said adhesive agent excludes metal.

15. An air flow sensor comprising:
a sensor element with a heated resistor formed on a semiconductor substrate by way of an electrical insulation layer; and
a sensor-supporting member containing a cut-out space in which said sensor element is adhered to said sensor-supporting member with an adhesive agent poured into grooves formed in a region of the substrate;
wherein a depression space extending along the peripheral edges of said sensor element is formed on at least one of an adhesion surface of said sensor element and an adhesion surface of said sensor-supporting member, an adhesive agent being poured into at least a part of said depression space.

16. An air flow sensor comprising:
a sensor element with a heated resistor formed on a semiconductor substrate by way of an electrical insulation layer; and
a sensor-supporting member containing a cut-out space in which said sensor element is adhered to said sensor-supporting member with an adhesive agent poured into grooves formed in a region of the substrate;
wherein a depression space extending along the peripheral edges of said sensor element is formed on at least one of an adhesion surface of said sensor element and an adhesion surface of said sensor-supporting member, an adhesive agent being poured into at least a part of said depression space, wherein said adhesive agent is continuously applied inside and outside of said peripheral edges of said sensor element.

* * * * *